United States Patent [19]
Diepeveen

[11] Patent Number: 4,518,218
[45] Date of Patent: May 21, 1985

[54] STEPPED POLYGON SCAN MIRROR

[75] Inventor: Neal Diepeveen, Fair Lawn, N.J.

[73] Assignee: Magnavox Government and Industrial Electronics Co., Ft. Wayne, Ind.

[21] Appl. No.: 535,478

[22] Filed: Sep. 26, 1983

[51] Int. Cl.³ .......................... G02B 3/02; G02B 27/17
[52] U.S. Cl. ........................................ 350/6.8; 350/452
[58] Field of Search ......................... 350/6.7, 6.8, 452

[56] References Cited
U.S. PATENT DOCUMENTS 3,488,102  1/1970  Buck et al. ........................ 350/6.8
3,614,193  10/1971 Beiser ............................... 350/3.65

Primary Examiner—John K. Corbin
Assistant Examiner—Rebecca D. Gass

[57] ABSTRACT

A mirror assembly for scanning incoming radiation from a scene onto one or more radiation detectors. The mirror assembly includes a cylindrical mirror arrangement having at least two mirror faces arranged around a central axis. Each mirror face is made up of a plurality of planar mirror segments. The mirror segments are arranged to form a stepped structure in which each mirror segment in a given mirror face is parallel to each other mirror segment in the mirror face.

15 Claims, 4 Drawing Figures

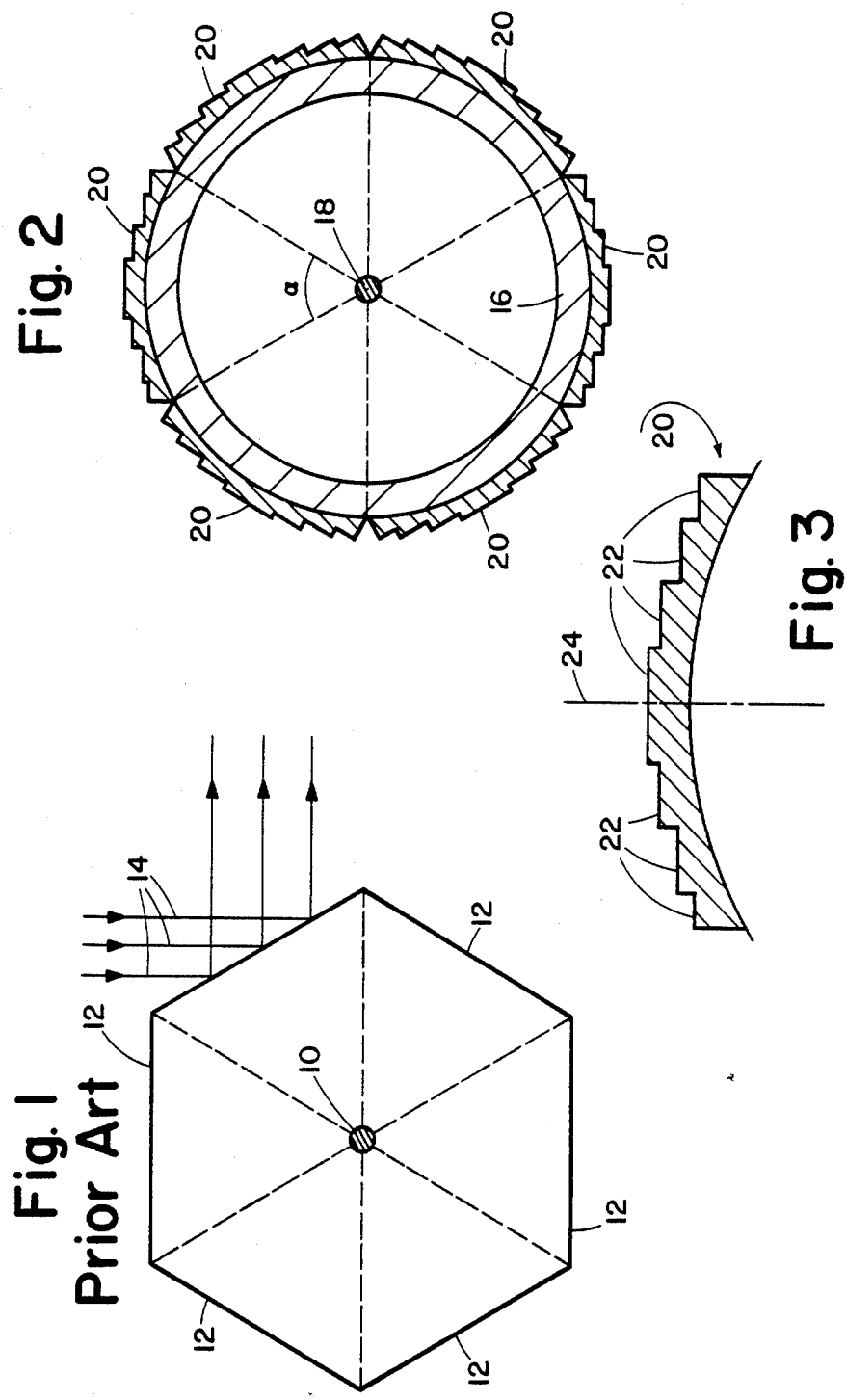

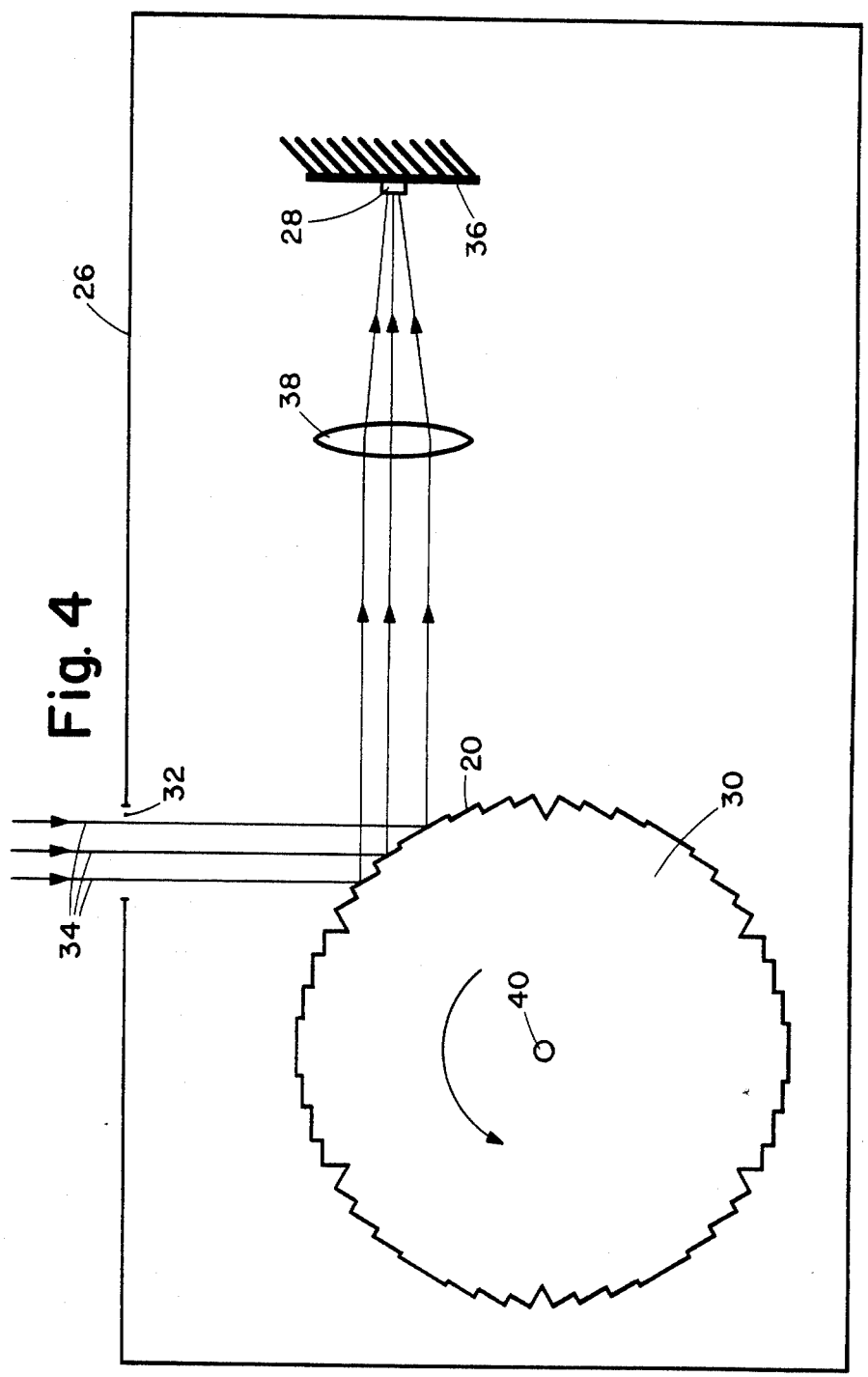

STEPPED POLYGON SCAN MIRROR

BACKGROUND OF THE INVENTION

The invention relates to mirror assemblies for scanning incoming radiation from a scene onto one or more radiation detectors. The invention also relates to imaging and other systems using such mirror assembles.

In many known thermal imaging systems, radiation from a scene to be imaged is scanned onto either a single detector or a detector array by means of one or more scanners. One known scanner is a polygonal scan mirror.

A known polygonal scan mirror is shown in FIG. 1, which schematically shows a cross-section through the scan mirror perpendicular to the axis 10 thereof. The scan mirror of FIG. 1 has six mirror faces 12. Each mirror face 12 has a planar surface so that all light which is incident at a given angle of incidence is reflected in a single angle of reflection (for a given position of the scan mirror). Moreover, each mirror face 12 subtends an angle α with respect to axis 10.

In the operation of the known scan mirror, radiation 14 which is incident on a mirror face 12 is reflected onto a detector, a detector array, or some other target (not shown in FIG. 1). As the scan mirror is rotated around axis 10, successive bundles of parallel rays (each bundle having a different angular orientation) are reflected onto the target. After the scan mirror rotates through an angle of α, the next mirror face 12 functions to reflect the radiation bundles onto the target. In this way, the target is scanned six times for each complete rotation of the scan mirror of FIG. 1.

A significant problem with the known scanners of FIG. 1 is that they generally are operated at very high rates of rotation, for example (39,375 or 78,750) revolutions per minute. This high speed operation generates high windage losses and creates severe acoustical noise unless the mirror is operated in a partially or completely evacuated chamber. Such operation is difficult and expensive to implement.

SUMMARY OF THE INVENTION

It is an object of the invention to provide a rotary scan mirror which can be operated at high speeds with reduced windage losses.

It is another object of the invention to provide a rotary scan mirror which can be operated at high speeds with reduced acoustical noise.

It is a further object of the invention to provide a thermal imaging system having a rotary scanner which can be operated at high speeds with reduced windage losses and with reduced acoustical noise.

According to the invention, a mirror assembly for scanning incoming radiation from a scene onto one or more radiation detectors comprises a cylindrical mirror arrangement having n faces arranged around an axis, where n is an integer greater than or equal to two. Each mirror face in the mirror assembly comprises a plurality of planar mirror segments. The mirror segments are arranged to form a stepped structure in which each mirror segment in a given mirror face is parallel to each other mirror segment in the mirror face.

In a preferred embodiment of the mirror assembly, the axis of the cylindrical mirror arrangement is an n-fold axis of rotational symmetry.

It is also preferable that a cross-section through each mirror face, in a plane which is perpendicular to the axis of the mirror arrangement, approximates an arc of a circle. Moreover, each mirror face preferably has a reflection plane of symmetry, where the symmetry plane lies in the middle of the mirror face.

In one embodiment of the invention, the cylindrical mirror arrangement has six mirror faces.

A system for scanning radiation onto a target according to the invention comprises a housing, a target, and a mirror assembly. The housing has an aperture through which incoming radiation can pass into the housing. The mirror assembly and the target are located in the housing. The mirror assembly scans incoming radiation onto the target, and comprises a cylindrical mirror arrangement having n mirror faces arranged around an axis, where n is an integer greater than or equal to two. Each mirror face comprises a plurality of planar mirror segments, where the mirror segments are arranged to form a stepped structure in which each mirror segment in a given mirror face is parallel to each other mirror segment in the mirror face.

In one preferred embodiment of the system according to the invention, the axis of the cylindrical mirror arrangement is an n-fold axis of rotational symmetry.

Preferably, the target comprises an array of infrared detectors. In another preferred embodiment of the invention, the system further includes a lens, arranged between the target and the mirror assembly. The array of infrared detectors forming the target is arranged in the focal plane of the lens.

Alternatively, a scan mirror according to the invention comprises a cylindrical mirror arrangement having at least two mirror faces arranged symmetrically around a central axis. Each mirror face comprises a plurality of planar submirrors arranged in parallel planes. Each submirror has a geometric center. The centers of each submirror in a mirror face lie substantially on a arc of a circle.

By providing a plurality of mirror segments or submirrors for each mirror face, each mirror face can be shaped to approximate a segment of a circularly-cylindrical surface. Now, high-speed rotation of such a scan mirror according to the invention creates little turbulence in the surrounding atmosphere, thereby reducing windage losses and acoustic noise.

BRIEF DESCRIPTION OF THE DRAWING

FIG. 1 is a schematic diagram of a cross-section through a known polygon scan mirror.

FIG. 2 is a cross-sectional view through a scan mirror assembly according to the invention.

FIG. 3 is a cross-sectional view through a single mirror face of a scan mirror according to the invention.

FIG. 4 is a schematic diagram of a system according to the invention for scanning radiation onto a target.

DESCRIPTION OF THE PREFERRED EMBODIMENTS

FIG. 2 shows a cross-section through a scan mirror assembly according to the present invention. The scan mirror assembly includes a circular cylinder 16 which is preferably hollow and lightweight, for ease of rotation. Cylinder 16 may be made of, for example, aluminum. Along the axis of circular cylinder 16, a shaft 18 is provided. Shaft 18 may be fixed on the axis of cylinder 16 by way of top and bottom plates (not shown) covering the ends of cylinder 16.

Provided on the outer surface of cylinder 16 are a number of mirror faces 20. In FIG. 2, there are six mirror faces 20 arranged around the cylinder axis on the surface of cylinder 16. Preferably, each mirror face subtends the same angle (shown as α in FIG. 2) with respect to the cylinder axis. In fact, each mirror face is preferably constructed substantially identically to each other mirror face, so that the axis of the cylindrical mirror arrangement of FIG. 2 is a 6-fold axis of rotational symmetry. In this preferred embodiment, the axis of the cylindrical mirror arrangement is most generally an n-fold axis of rotational symmetry, where n is the number of mirror faces and where n is an integer greater than or equal to two. (The axis of the cylindrical mirror arrangement is n-fold if rotation of the mirror arrangement through an angle of $2\pi/n$ results in an orientation of the mirror arrangement which is indistinguishable from the original orientation.)

A more detailed view of a single mirror face according to the invention is shown in FIG. 3. Mirror face 20 comprises a plurality of planar mirror segments 22. The mirror segments 22 are arranged to form a stepped structure in which each mirror segment 22 is parallel to each other mirror segment 22 in the same mirror face 20. In FIG. 3, the plane of each mirror face 22 extends perpendicularly into and out of the plane of the drawing. In this cross-section which is in a plane perpendicular to the axis of the cylindrical mirror arrangement, it can be seen that the cross-section through the mirror arrangement approximates an arc of a circle.

As described above, it is preferred that each cylindrical mirror arrangement according to the invention has an axis of rotational symmetry. In addition, each mirror face 20 preferably has a reflection plane of symmetry. As shown in FIG. 3, this symmetry plane 24 lies in the middle of the mirror face 20.

Each mirror face 20 comprises a plurality of planar mirror segments or planar submirrors 22. Each submirror has a geometric center. Preferably, the centers of each submirror in a mirror face lie substantially on an arc of a circle.

A scan mirror assembly according to the invention can be made, for example, in the following manner. A female mold is provided having an inner surface which is accurately shaped to match the desired stepped structure of at least one mirror face. This inner surface is treated with a release compound, and is then covered with a thin reflective metal film (such as aluminum or silver). The reflective film may be applied, for example, by electroplating or by sputtering. After the reflective film is applied to the inner surface of the mold, the cylinder (element 16 in FIG. 2) is placed near the film, and the space between the cylinder and the film is filled with epoxy to bond the two together. This entire process is then repeated for each mirror face.

Alternatively, each mirror face could be made by photoetching a substrate using a series of masks so as to produce the desired stepped structure. The etched product could be provided with a reflective film by sputtering or by electroplating, and the entire mirror face could then be bonded to the cylinder (which might be a polygonal cylinder).

A system for scanning radiation onto a target is schematically shown in FIG. 4. The system includes a housing 26, a target 28, and a mirror assembly 30. Both the target 28 and the mirror assembly 30 are located within the housing 26. Housing 26 is provided with an aperture 32 through which incoming radiation 34 can pass into the housing.

The target 28 in the housing 26 is preferably an infrared detector or an array of such detectors. In the case of a linear array, the array extends perpendicularly into and out of the plane of the drawing. The target 28 is fixed to the housing 26, as schematically shown at 36.

The mirror assembly 30 of the system shown in FIG. 4 is preferably the scan mirror assembly shown in cross-section in FIG. 2. For simplicity, only one mirror face 20 is shown in FIG. 4. However, it is to be understood that the mirror assembly 30 in FIG. 4 has mirror faces 20 completely surrounding the axis, as shown in FIG. 2.

In addition to target 28 and mirror assembly 30, the system according to the invention for scanning radiation onto the target further includes a lens 38 arranged between the target 28 and the mirror assembly 30. The target 28 (e.g. the array of infrared detectors) is arranged in the focal plane of the lens 38.

The system according to the invention for scanning radiation onto a target operates in the following manner. Incoming radiation 34, as well as other bundles of parallel rays which intersect the rays shown, pass through the aperture 32 and into the housing 26. These rays are incident on the surfaces of the mirror segments or submirrors of a mirror face 20 of the mirror assembly 30. Depending upon the angular orientation of the mirror face 20, a given bundle or bundles of parallel rays will be reflected through lens 38 and focused on to the target 28. As the mirror assembly 30 is rotated (by means which are not shown) in the direction of the arrow around axis 40, the angular orientation of the mirror face 20 is changed to reflect a different bundle or bundles of parallel rays through lens 38 and onto the target. In this manner, radiation emanating from a scene is scanned onto one or more radiation detectors.

After the mirror assembly 30 is rotated through a given angle (the angle α, as shown in FIG. 2), the next succeeding mirror face 20 is positioned to reflect the incoming radiation through lens 38 and onto the target 28. Thus, for each complete rotation of the mirror assembly 30 around the axis 40, the scene is scanned onto the target 28 six times (or, in general, once for each mirror face 20 of the mirror assembly 30).

In practice, it is usually necessary to rotate the mirror assembly 30 at a speed of 39,375 or 78,750 revolutions per minute. In prior systems operating at these speeds, it was necessary to rotate the mirror assembly in a partial vacuum. According to the present invention, however, the stepped polygon scan mirror should be capable of operating at these speeds in a normal atmosphere without undue windage losses, and without excessive acoustical noise.

What is claimed:

1. A mirror assembly for scanning incoming radiation from a scene onto one or more radiation detectors, said mirror assembly comprising:
   a cylindrical mirror arrangement having n mirror faces arranged around an axis, n being an integer greater than or equal to two;
   characterized in that each mirror face comprises a plurality of planar mirror segments, the mirror segments being arranged to form a stepped structure in which each mirror segment in a given mirror face is parallel to each other mirror segment in the mirror face.

2. A mirror assembly as claimed in claim 1, characterized in that the axis of the cylindrical mirror arrangement is an n-fold axis of rotational symmetry.

3. A mirror assembly as claimed in claim 2, characterized in that a cross-section through each mirror face, in a plane which is perpendicular to the axis of the mirror arrangement, approximates an arc of a circle.

4. A mirror assembly as claimed in claim 3, characterized in that each mirror face has a reflection plane of symmetry, where the symmetry plane lies in the middle of the mirror face.

5. A mirror assembly as claimed in claim 4, characterized in that the cylindrical mirror arrangement has six mirror faces.

6. A system for scanning radiation onto a target, said system comprising:
 a housing having an aperture through which incoming radiation can pass into the housing;
 a target in the housing; and
 a mirror assembly, in the housing, for scanning the incoming radiation onto the target, said mirror assembly comprising:
 a cylindrical mirror arrangement having n mirror faces arranged around an axis, n being an integer greater than or equal to two;
 wherein each mirror face comprises a plurality of planar mirror segments, the mirror segments being arranged to form a stepped structure in which each mirror segment in a given mirror face is parallel to each other mirror segment in the mirror face.

7. A system as claimed in claim 6, characterized in that the axis of the cylindrical mirror arrangement is an n-fold axis of rotational symmetry.

8. A system as claimed in claim 7, characterized in that the target comprises an array of infrared detectors.

9. A system as claimed in claim 8, characterized in that the system further comprises a lens, arranged between the target and the mirror assembly, said target being arranged in a focal plane of the lens.

10. A system as claimed in claim 9, characterized in that a cross-section through each mirror face, in a plane which is perpendicular to the axis of the mirror arrangement, approximates an arc of a circle.

11. A system as claimed in claim 10, characterized in that each mirror face has a reflection plane of symmetry, where the symmetry plane lies in the middle of the mirror face.

12. A system as claimed in claim 11, characterized in that the cylindrical mirror arrangement has six mirror faces.

13. A scan mirror comprising;
 a cylindrical mirror arrangement having at least two mirror faces arranged symmetrically around a central axis;
 characterized in that each mirror face comprises a plurality of planar submirrors arranged in parallel planes, each submirror having a geometric center, the centers of each submirror in a mirror face lying substantially on an arc of a circle.

14. A scan mirror as claimed in claim 13, characterized in that each mirror face has a reflection plane of symmetry, where the symmetry plane lies in the middle of the mirror face.

15. A scan mirror as claimed in claim 14, characterized in that the cylindrical mirror arrangement has six mirror faces.

* * * * *